E. C. AND H. W. BECHT.
SHAPING APPARATUS.
APPLICATION FILED MAR. 13, 1919.
1,318,310.
Patented Oct. 7, 1919.
5 SHEETS—SHEET 2.
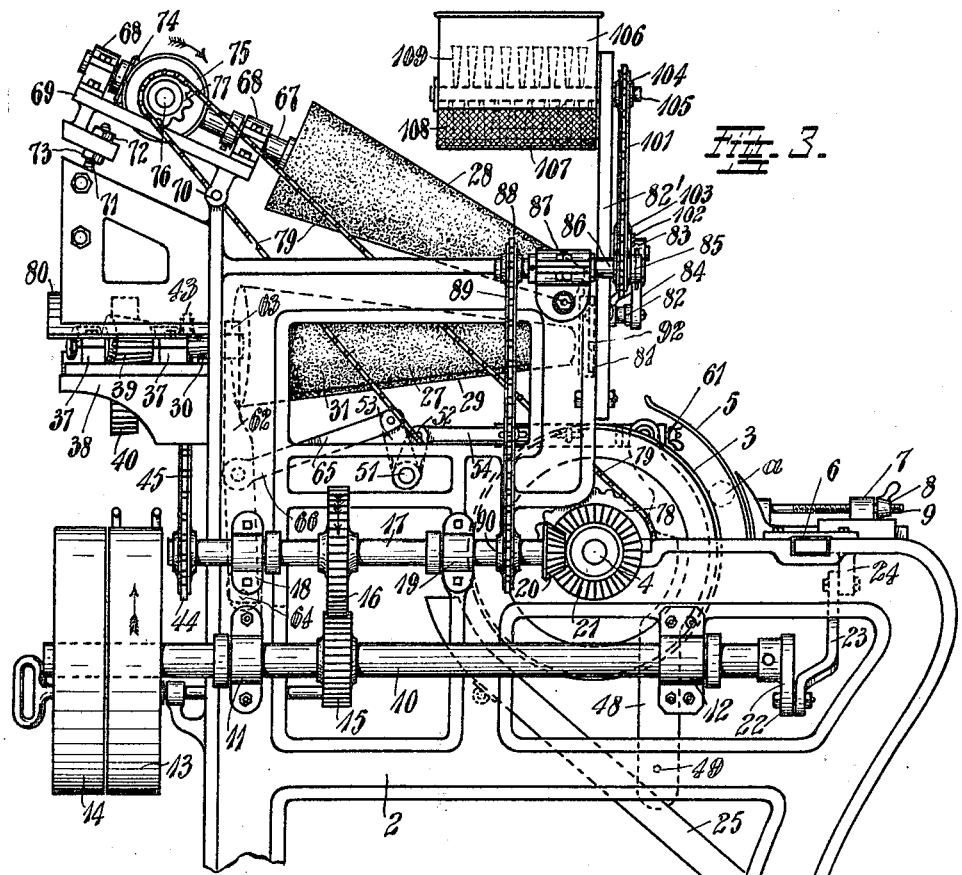
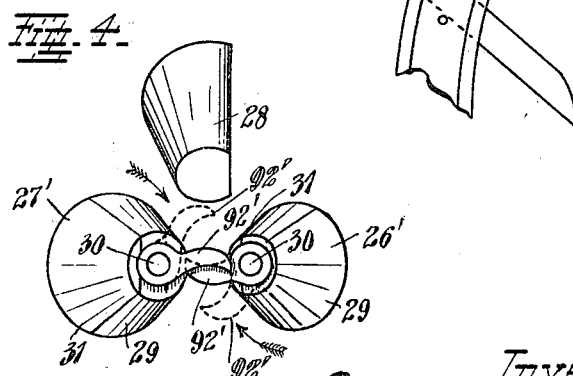

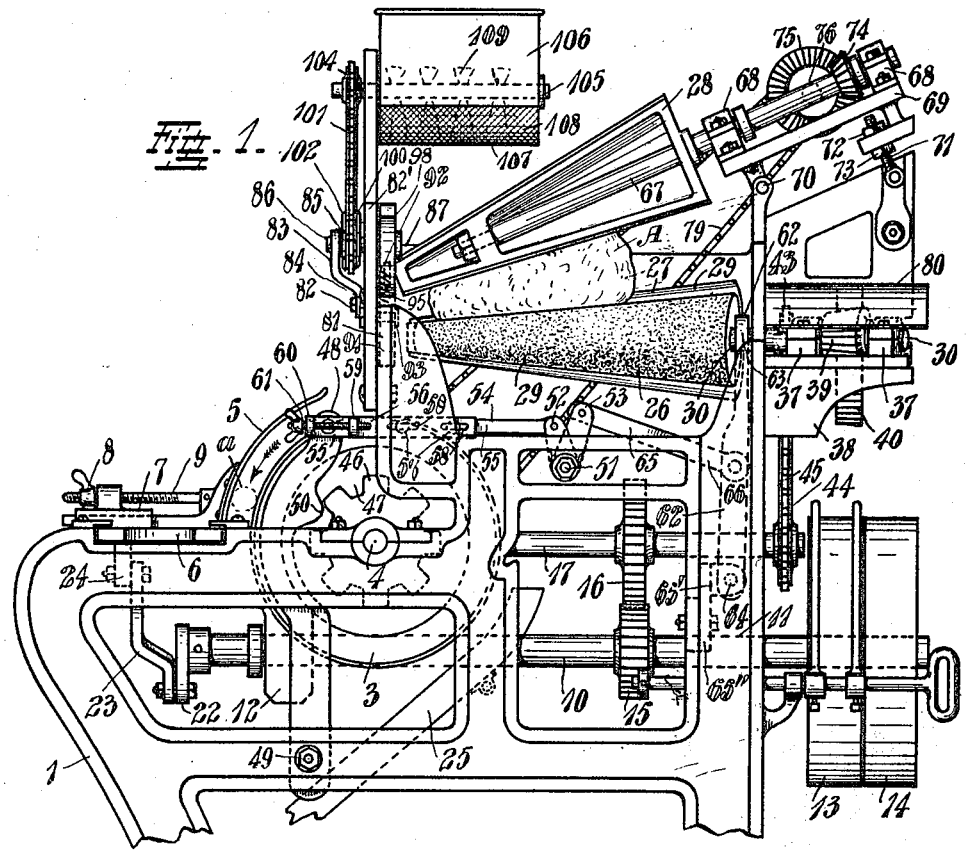

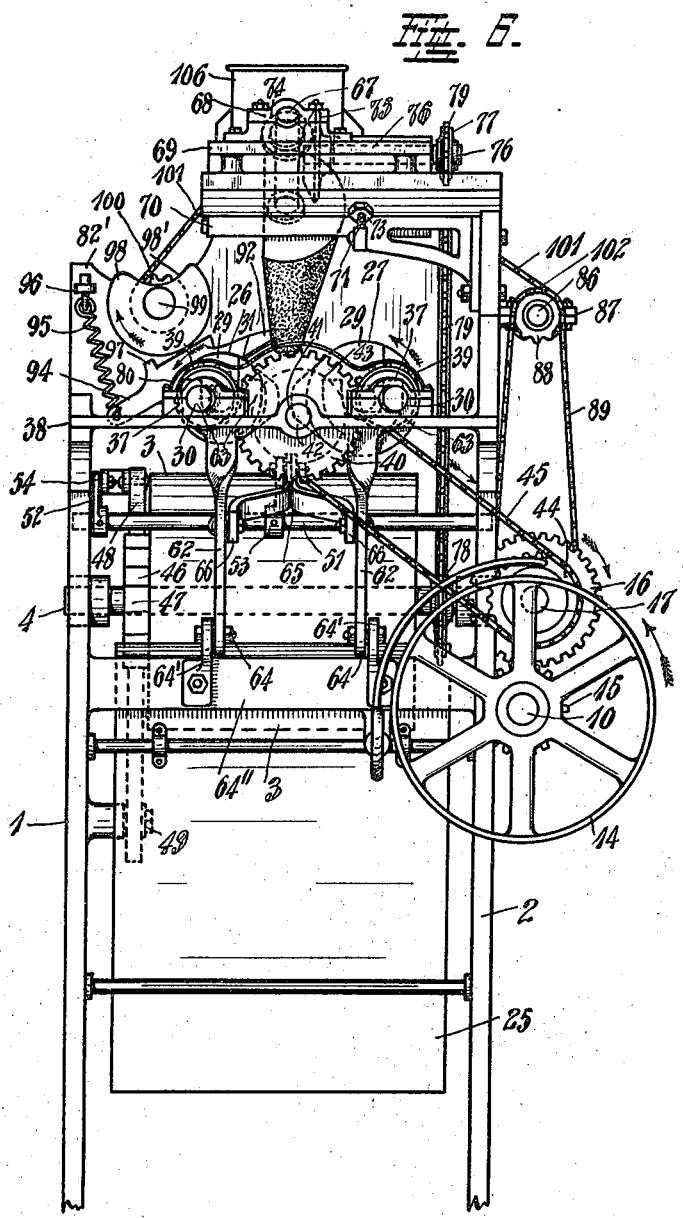

E. C. AND H. W. BECHT.
SHAPING APPARATUS.
APPLICATION FILED MAR. 13, 1919.
1,318,310.
Patented Oct. 7, 1919.
5 SHEETS—SHEET 5.
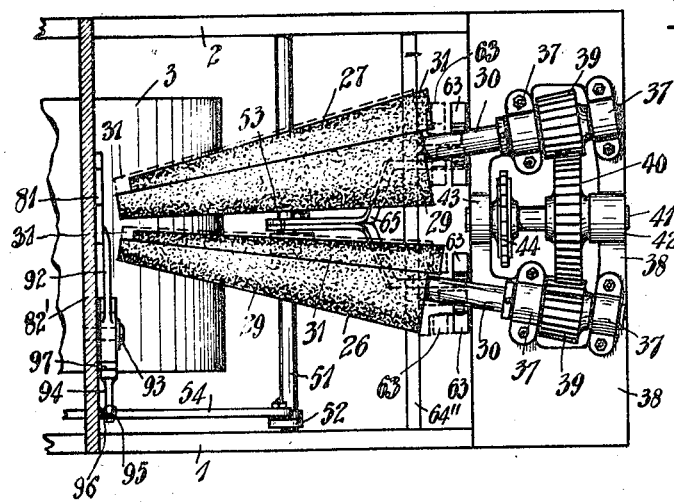
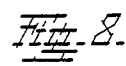
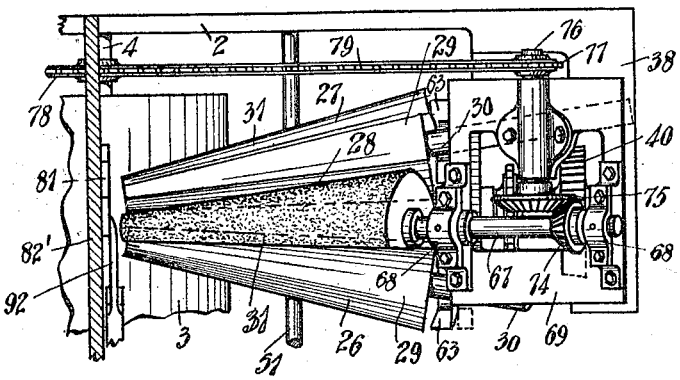
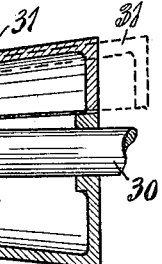
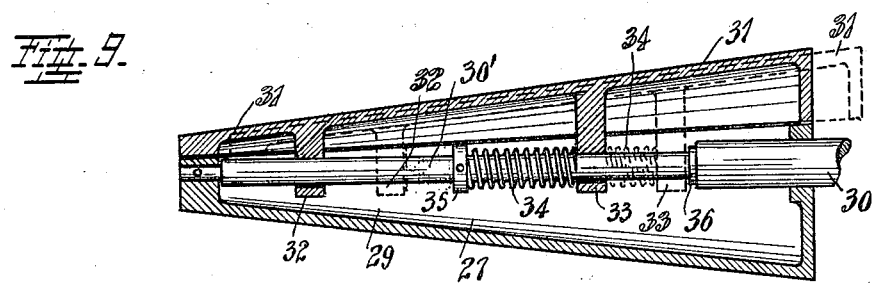

UNITED STATES PATENT OFFICE.

EDWARD C. BECHT, OF NEWPORT, KENTUCKY, AND HERMAN W. BECHT, OF RISING SUN, INDIANA; SAID HERMAN W. BECHT ASSIGNOR TO SAID EDWARD C. BECHT.

SHAPING APPARATUS.

1,318,310.   Specification of Letters Patent.   Patented Oct. 7, 1919.

Application filed March 13, 1919. Serial No. 282,355.

*To all whom it may concern:*

Be it known that we, EDWARD C. BECHT and HERMAN W. BECHT, citizens of the United States, and residents, respectively, of Newport, in the county of Campbell and State of Kentucky, and of Rising Sun, in the county of Ohio and State of Indiana, have invented certain new and useful Improvements in Shaping Apparatus, of which the following is a specification.

Our invention relates to bread, pastry and confection making.

One object of our invention is to produce short sub-divisions of material shaped into approximately spherical form.

A further object of our invention is to facilitate preliminary shaping or molding to a cylindrical shape of desired approximate diameter, after which the thus shaped or molded material may be subjected to any one of various further operations.

A further object of our invention is to facilitate such operations as these upon material of such makeup and consistency that any considerable pressure or maceration thereof is detrimental. This kind of materials is usually molded or shaped entirely by hand, so that the proper care may be taken not to excessively press or agitate the substance. Our object is to minimize the hand work necessary in molding or shaping these materials, thereby saving labor and decreasing the cost of production, and also affording a more sanitary product by minimizing the contact of the hands with the substance.

Other objects will appear in the ensuing description.

Our invention consists in the combination of parts and in the details of construction and arrangement of parts as will hereinafter be more fully described and claimed.

In the drawings:

Figure 1 is a partial front-side elevation of a machine embodying our invention;

Fig. 2 is a partial similar view showing a modification thereof;

Fig. 3 is a rear side elevation of the machine shown in Fig. 1;

Fig. 4 is a partial left-end elevation of the machine of Figs. 1 and 2 showing another modification;

Fig. 5 is a left-end elevation of the machine shown in Figs. 1 and 3;

Fig. 6 is a right-end elevation of the same;

Fig. 7 is a partial plan view of the same with upper parts of the structure omitted; the dotted lines indicating different positions of certain parts;

Fig. 8 is a partial plan view of parts omitted in Fig. 7; and

Fig. 9 is a lengthwise horizontal cross-section of one of the sectional rollers.

As shown in Figs. 1, 3, 5 and 6, the complete machine is provided for producing approximately spherical balls or pellets of the material, and is more especially designed for producing such forms of centers for candy. It will be understood, however, that materials for other purposes where an approximately spherical form is required may be worked in a machine of this kind.

In this machine, a suitable framework is made up of a front frame-member 1 and a rear frame-member 2 in which a large cylindrical roll 3 has its shaft 4 journaled with axis lying from front to rear of the machine about midway of the length of the frame near the top thereof. A segment plate 5 stands at the left of the roll 3 (looking from the front) and is substantially concentric therewith and spaced therefrom and extends up from the left side of the roll 3 close to the top thereof. This segment plate 5 is mounted on a cross slide 6 in the frame-members 1 and 2 at the left; and the segment plate has a slidable mounting 7 on this cross slide 6 permitting it to be moved toward or from the roll 3 by means of a thumb nut 8 on a screw 9. The driving shaft 10 extends along the rear side of the machine with bearings 11 and 12 on the rear of the frame-member 2, and at the right end of the machine has a tight pulley 13 and a loose pulley 14 by means of which the shaft 10 may be driven or stopped, as desired. A gear 15 on this shaft 10 meshes with a gear 16 on a parallel shaft 17 above the shaft 10 in bearings 18 and 19 on the rear side of the frame-member 2. At its left end, this upper shaft 17 carries a bevel pinion 20 meshing with the bevel gear 21 fixed on the shaft 4 of the roll 3. The left end part of the lower shaft 10 has fixed on it the crank 22, and a pitman 23 has one end pivoted to this crank 22 and the other end pivoted to a downward projection 24 on the cross slide 6 of the segment plate 5. A chute 25 inclines downwardly to the left between the front and rear frame-members 1 and 2 under the roll 3.

This machine, so far as described, is especially intended for receiving between the roll 3 and segment plate 5 at the top, short relatively thick pieces of material *a* which are carried down under the segment plate 5 by the roll 3 rotating to the left, as indicated by the arrow in Fig. 1. This, in itself, produces a rolling motion of the piece of material around one axis, so that the material would be given an approximately cylindrical shape. But at the same time, the segment-plate 5 is being reciprocated transversely through the medium of the pitman 23 and crank 22, so that the piece is also having a rolling motion about an axis at right angles to the first. The resultant of these two motions while the piece travels down between the roll 3 and plate 5 is to deliver the piece at the lower end of the plate 5 into the chute 25 in an approximately spherical shape; the accuracy of the spherical form depending somewhat upon the solidity of the material but being sufficient in any case for the purposes. By adjusting the plate 5 toward or away from the roll 3, the space between them may be made of the right width to receive the pieces of any given size within a moderate range.

This part of the machine, so far as described, will, with any feeding means, work successfully upon such materials as permit of ordinary heavy feeding pressure to bring material continuously into position to be cut off into the desired pieces to fall onto the top of the roller 3 and pass into the space under the plate 5 as just described. But many materials which require to be worked into small approximately spherical balls of this kind are of such makeup and consistency that any considerable pressure or amount of agitation or maceration incident to the feeding or preliminary molding operation entirely spoils the material for the purpose intended. For instance, a fondant made up of sugar or syrup or similar substances, or mixtures of these, is a very desirable center for many kinds of fine candies; but if such a material is subjected to screw pressure or screw feeding or the like which subjects it to considerable agitation and pressure, the material is converted into a coarse, sticky mass, whereas in its desired condition as candy centers preliminary to coating, it should be of a fine, smooth texture with a comparatively dry and smooth surface, and of such consistency as to retain its shape for the subsequent operations thereon.

We provide for the preliminary molding operation on such materials as this, as well as upon any other plastic materials of what may be generally termed a semi-solid consistency, by combining with this mechanism so far described such mechanism that but little more pressure is exerted on the material in this preliminary operation than is incident to the weight of the mass of material itself.

Thus, as shown herein, we provide a pair of lower sectional elongated conical rolls 26 and 27 with their greater diameters near the right end of the machine and their lesser diameters close together over the roll 3 at the left; and a segmental elongated conical roll 28 lying above these sectional rolls 26 and 27 with its larger end at the right and somewhat elevated above the rolls 26 and 27, and its smaller end down close to the left smaller diameters of the sectional rolls 26 and 27. The purpose in combining these three rolls 26, 27 and 28 in this way is to have the material A (Fig. 1) placed between them at the right where they are farther apart, and to have this material forced to the left to emerge through the restricted space between the small ends of the free rolls; the mass of material A being, by the rotation on its own axis and its movement to the left, formed into an approximately cylindrical shape where it emerges from between the rolls. In connection with this, we provide suitable cutting mechanism to sever the pieces from this approximately cylindrical projection of material to drop onto the roll 3 and be operated upon as just before described. The details of the cutting mechanism will be later described.

The construction of each one of the sectional rolls 26 and 27 is shown in the lengthwise section of the roll 27 in Fig. 9. It comprises the main greater segment 29 fixed coaxially on a shaft 30, and the small segment 31 having radially inwardly extending lugs 32 and 33 bearing on the shaft 30 inside the greater segment 29. These two segments are thus held close together, so that their flat sides have only slight clearance, and, in one relation, together make up approximately a complete conical roll. The lesser segment 31 is permitted to slide to the right along the shaft 30, however, so that its larger end projects to the right past the larger end of the main part 29. A helical spring 34 is coiled around the shaft 30 between the right-hand lug 33 and a collar 35 fixed on the shaft 30. Preferably, the part 30' of the shaft 30 on which the lugs 32 and 33 slide is reduced in diameter so that a shoulder 36 is formed at the right to limit the projection of the segment 31 past the segment 29 at the right.

The shafts 30 of these rolls 26 and 27 are in the same horizontal plane, and have projections to the right, each having two bearings 37 on a bracket 38 fixed to the right ends of the frame-members 1 and 2. Fixed on each shaft 30 between its bearings 37 is a bevel pinion 39, and these pinions 39 mesh with a middle bevel gear 40 fixed on a shaft 41 journaled from left to right in bearings 42 on the bracket 38, and also having fixed on it at the left a sprocket-wheel 43. The upper rear shaft 17 previously described has fixed on its left end part a sprocket wheel 44, and a sprocket-chain 45 passes around this wheel 44 and the wheel 43, so that the two sectional conical rolls 26 and 27 are both driven in the same direction over toward the front of the machine when the machine is driven as hereinbefore described.

Fixed on the shaft 4 with the roll 3, between it and the front frame-member 1, is a disk 46 which has a plurality of evenly spaced notches 47 in its periphery. A cam lever 48 stands upright just to the left of this disk 46 and has a fulcrum 49 for its lower end part in the frame-member 1. This cam lever 48 has the cam part 50 which bears against the periphery of the disk 46 in such a way as to permit the lever 48 to swing to the right when the part 50 enters a notch 47 in the disk 46 or to be pushed to the left when the part 50 is forced out of a notch 47 by the rotation of this disk 46 along with the roll 3. About midway from the lever 48 over to the right end of the machine is a transverse fulcrum bar 51 with bearings in the frame-members 1 and 2, and with an upwardly projecting arm 52 near the front frame-member 1 and another upwardly projecting arm 53 midway to the rear of the machine. A sectional connecting bar 54 is made up of a section 55 having one end part pivoted to the arm 52, and a section 56 having one end part pivoted to the upper end part of the cam lever 48; these two sections 55 and 56 being slidably held together by lugs 57 of the section 56 in slots 58 of the section 55. These sections 55 and 56 have forward projections 59 and 60 at the right and left, respectively, of the pivotal connection of the lever 48, and an adjusting screw 61 holds the two lugs together so that, by turning this screw, the length of the sectional connecting rod 54 may be adjusted.

At the right-hand end of each sectional roll 26 and 27 is an upright fork 62 with members 63 flanking the shaft 30, and having a fulcrum 64 for its lower end part in a respective bracket 64' on a front-to-rear bar 64'' that connects the frame-members 1 and 2 at the right end of the machine. A bifurcated connecting rod 65 has its members 66 pivoted to respective forks 62 at points about midway from the fulcrum 64 to the upper end parts 63 of the forks, and the other end of this rod 65 is pivoted to the arm 53, on the fulcrum-bar with the arm 52 at the middle of the machine as before described. The members 63 of the forks are made large enough so that at any time during the rotation of the respective roll 26 or 27 at least one of these fork members 63 will be adapted to engage with the right-hand end of the smaller segment 31 of the roll; which, as before described, is normally held projected from the main part 29 at the right under the action of the spring 34 inside the roll. But this spring 34 will yield to pressure exerted by the fork 62, whereupon the fork may push the small segment 31 to the left and make up, for the time being, the complete and regular cone of the roll 26 or 27.

The segmental conical roll 28 is simply fixed on a shaft 67 which has a projection up to the right in bearings 68 on an adjustable bracket 69. This bracket 69 has the transverse pivotal support 70 near its left end on the top of the right-hand end of the machine-frame, and a stud 71 is pivoted to a rear right-hand projection of this top of the machine-frame and extends up through the rear end part of the bracket 69 with nuts 72 and 73 screwed onto the stud 71 above and below the bracket. Near the rear one of its bearings 68, the shaft 67 has the bevel pinion 74 in mesh with a bevel gear 75 fixed on a front-to-rear shaft 76 which has fixed on its projecting rear end part a sprocket-wheel 77. The shaft 4 of the roll 3 has fixed on it between the roll 3 and the rear frame-member 2 a sprocket-wheel 78, and a sprocket-chain 79 passes around this wheel 78 and around the wheel 77, with the result that the segmental roll 28 is also rotated over toward the front of the machine. An apron 80 is fixed on the right-hand end of the machine over the gears 39 and 40, and is slightly channeled at its middle in line with the space between the rolls 26 and 27; this apron 80 acting as a guard over the gears and serving to support the material A just preliminary to its insertion between the conical rolls.

The cutting device, as shown in Figs. 1 and 3 and Figs. 5 to 8, inclusive, comprises a lower blade 81 which has a fulcrum 82 on the upwardly extended middle part 82' of the machine-frame; this blade 81 being curved downwardly and forwardly and being adapted to swing on its fulcrum 82 down below the upper surfaces of the front-end parts of the rolls 26 and 27, or to swing up slightly thereabove. This swinging motion is imparted to this blade 81 by means of a pitman 83 having one end part pivoted to an arm 84 fixed to the blade 81, and its other end pivoted to a short crank 85 on a short shaft 86 that is journaled from left to right in a bearing 87 on the rear frame member 2 near the top thereof;

this shaft having a sprocket-wheel 88 with a chain 89 passing around another sprocket-wheel 90 fixed on the shaft 17 that drives the roll 3 as before described. Preferably, as shown, the blade 81 is at the right of the frame extension 82' and its pivot 82 extends through and bears in this extension 82' with the arm 84 and other connecting parts at the left outside the extension; the blade 81 and arm 84 being both fixed to the pivot 82. This extension 82' has the aperture 91 (Fig. 5) through it for passage of the material A from between the rolls 26, 27 and 28 over the blade 81. The upper blade 92 also lies inside or at the right of the extension 82' and has a fulcrum 93 in the extension 82', so that it may swing down alongside the lower blade 81 when the lower blade 81 rises, or swing up away from the space where the material A emerges from below the rolls. This blade 92 has an extension 94 toward the front of the machine which has its front-end part connected to the tension spring 95, the upper end of which is connected to a lug 96 on the upper part of the machine-frame extension 82'. Between this spring and the fulcrum 93, the upper side of this extension 94 has a tooth 97. A cam-wheel 98 is mounted on a short shaft 99 journaled from left to right through the extension 82'; the cam-wheel 98 being at the right-hand side of the extension and having most of its periphery circular, but having a minor depressed part 98'. At the left of the extension 82' a sprocket-wheel 100 is fixed on the shaft 99 and is turned by a sprocket-chain 101 passing around a sprocket-wheel 102 on the shaft 86 with the arm 85 that drives the lower blade 81.

Preferably, the lower stretch of this chain 101 is carried on an idler 103 above the aperture 91; and the upper stretch runs over a sprocket-wheel 104 on a left-to-right shaft 105 extending through a hopper 106 mounted on the top of the extension 82' over the rolls 26, 27 and 28, and having a left-to-right slot 107 in its bottom covered by a sieve 108 inside the hopper, through which substance may be sifted under the action of blades 109 rotated with the shaft 105 inside the hopper 106. This sifting apparatus has no immediate dependence upon the cutting apparatus, except that it is convenient to drive it by the same chain 101 that drives the cam 98.

As long as the tooth 97 bears on the circular part of the cam periphery, the blade 92 is held up; but as the depressed part of the periphery passes the tooth 97, the spring 95 pulls up on the front extension 94 and forces the blade 92 quickly downwardly. The operative connections are so proportioned and arranged that this upper blade 92 will pass downwardly just as the lower blade 81 is completing its upward movement; with the consequence that any material projecting through the space which they traverse is sheared off very suddenly and without materially interfering with any movement which this material is having at the time, either rotary or axial.

The two lower sectional rolls 26 and 27 are set in the same relative positions in the machine. Thus their major or solid parts 29 are both presented upwardly toward the segmental roll 28 at the same time; and likewise with their slidable or smaller parts 31. These rolls 26 and 27 are so geared together, as before described, that they rotate at the same speed. Also, the upper segmental roll 28 has its operative connections so proportioned and arranged that it rotates at the same speed as the rolls 26 and 27 and is so set in the machine that it presents its conically curved side down toward the rolls 26 and 27 when these rolls are presenting their solid parts 26 and 27 upward, and therefore presents its flat side toward these rolls when they are presenting their slidable parts 31 upward. The operative connections and the notched disk 46 are so proportioned and arranged that the forks 62 are simultaneously pulled to the left once during that part of each revolution of the rolls in which the slidable parts 31 are presented upward; so that these slidable parts 31 are pushed to the left by these forks during this time. During another part of each revolution, after these slidable parts have passed downward, the parts are permitted to recede by the entrance of the cam-lever part 50 into a notch 47 in the disk 46, and the springs 44 push the slidable part 31 and the forks 62 back to the right. Also, the operative connections to the cutting mechanism are so proportioned and arranged that this cutting mechanism is operated once during that part of each revolution of the rolls in which the solid parts 29 of the lower rolls are presented upward.

The material A to be operated upon, whether it be a highly sensitive material, as before referred to, or any more stable but plastic substance, is taken in relatively large sized masses in about the proportion indicated in Fig. 1, and is passed in from the apron 80 onto the tops of the rolls 26 and 27. The mass A then begins to rotate on its own axis reversely to the rotation of the rolls 26 and 27 merely by virtue of its weight against these rolls. As long as the solid parts 29 of these rolls are passing under the mass A, the conical curved part of the upper roll 28 is passing it also. This action tends to form the mass A into an elongated cone of a diameter at any given place along the length approximately equal to that of the circle which may be inscribed tangent to the surfaces of the three rolls 26, 27 and 28. But were this alone relied upon, the mass would simply continue to rotate in the same longitudinal location between the rolls. The slidable parts 31 of the lower rolls 26 and 27 serve to advance the mass A while the flat side of the upper roll 28 is passing the top of the mass and leaving the mass free to be moved in to the left; and it will be noted that this leftward feeding of the mass is effected without increasing the pressure on the mass because the mass is entirely free from confinement at the top during this leftward movement.

The continuous operation, therefore, results in a slight leftward movement of the mass alternated with a very moderate rolling pressure of the mass in its new position; these alternations occurring once at each revolution of the rolls. As the mass continues to advance to the left, its left end protrudes from between the adjacent ends of the three rolls 26, 27 and 28; and this protruding part would, if self-supporting, increasingly extend out in the form of a cylinder of diameter approximately equal to the circle that could be inscribed tangent to the extreme left ends of the three rolls 26, 27 and 28.

If an elongated shape of the mass is all that is desired, it may thus be produced with a modified machine such as that indicated in Fig. 2 where the cutting mechanism is omitted, and instead of the roll 3 and its segment-plate 5, there is a pulley 110 around which passes a conveyer belt 111 which passes up over a roller 112 close to the ends of the three rolls 26, 27 and 28, and from there passes to the left along similar rolls 113 to any distance desired. This belt 111 thus supports the protruded cylindrical mass a' which may be delivered in any suitable manner or further operated upon, as desired, to produce longer or shorter pieces of the material.

However, when the machine is provided with the cutting mechanism and the roll 3 and segment-plate 5, this mechanism operates during the adjacency of the solid parts 29 of the lower rolls and the bearing part of the upper roll, with the result that pieces are cut off, each of a length about equal to its diameter; and these pieces fall onto the roll 3 and are made into approximately spherical form by the coöperation of the roll 3 and segment-plate 5, as hereinbefore described. The length protruded between each cutting operation is dependent upon the proportion existing at the time between the area of the inscribed circle between the extreme left ends of the rolls and the stroke of the sliding parts 31 as imparted by the forks 62. If that stroke be large in proportion to that area, the protruded part will be long in proportion to its diameter; and vice versa.

It is for controlling these proportions of the protruded parts where they are to be severed by the cutting mechanism, as well as to control the diameter of the continuous length in such a machine as shown in Fig. 2, that the upper segmental roll 28 has its mounting bracket 69 provided with the pivot mounting 70. By setting the adjusting nuts 72 and 73 on the pivoted stud 71, the entire roll 28 may be swung down toward the lower rolls 26 and 27 or up therefrom, decreasing or increasing the area where the mass emerges. By this means, considerable adjustment of the diameter in proportion to the stroke is possible. It is also with this object in view that the connecting rod 54 is made adjustable in length. If it is made longer, the forks 62 may swing farther to the right when the cam lever part 50 enters a notch 47 in the disk 46, and the forks 62 will not be pulled so far to the left when the part 50 rides out of the notch. The movement of the section 31 to the right is limited by the engagement of its lug 33 with the shoulder 36 on the shaft 30. Thus, this change in the operation of the forks 62 decreases the stroke of the sliding segment 31; and, conversely, if the connecting rod 54 be shortened, this stroke is increased. Of course this shortening of the rod 54 must not be carried to the extent that will cause the forks 62 to strike the solid parts 29 of the rolls before the cam lever part 50 rides out of the notch 47 in the disk 46. This limitation of the left-hand movement of the forks 62 thus really limits the left-hand movement of the slidable segments 31.

Both segments 29 and 31 of both rolls 26 and 27 and the curved conical surface of the upper roll 28 are preferably suitably corrugated or roughened as indicated; and it will be understood that the surfaces of the roll 3 and segment-plate 5 that contact with the material may also be suitably roughened in accordance with the best operation of such parts. Also preferably the rear roll 27 is somewhat greater in diameter than the front roll 26, and having its axis in substantially the same horizontal plane as that of the front roll 26, extends higher than said front roll. This counteracts the slight tendency of the advanced edge of the upper segmental roll 28 to push the mass A out rearwardly at each passage onto the mass. The hopper 106 contains dry powdered substance, such as starch or the like, which is constantly sifted onto the three rolls and onto the mass A to prevent sticking of the mass to the rolls; and some of this dry substance also finds its way to the surface of the roll 3; or, in the case of the example of Fig. 2, to the conveyer belt 111.

The machine constructed and arranged according to the principles of my invention, as just exemplified and specifically described, successfully operates in the described desired manner upon the most delicate and sensitive compositions used for candy-centers on account of the extremely moderate disturbance to which the mass A is subjected in the preliminary feeding and rolling operation, as well as in the subsequent rolling operation between the roll 3 and plate 5 where these are used. In accordance with these purposes, the upper roll 28 is adjusted relatively to the lower rolls 26 and 27, so that there will be a sufficient protrusion of the mass at each revolution without at any time imposing excessive pressure on it. This is also true of the adjustment of the segment-plate 5 relatively to the roll 3; where the space between these parts is just sufficient to permit the severed piece to attain its approximately spherical diameter while passing therethrough without at any time during the travel therethrough being subjected to any excessive pressure.

It will be understood that with most of these candy-center substances, the object is to have a fine smooth surfaced piece for convenient handling and to avoid deterioration clear up to the time of coating. Usually after the piece receives its coating and the coating cools and contracts, this piece, which has now become the interior of the piece of candy, is subjected to considerable pressure by the contracted coating. Also, it is desirable that the center of the candy should have a somewhat coarse or mealy consistency and some stickiness; and these are the qualities imparted to the center by the pressure. Advantage is taken of this to afford the best conditions preliminary to coating, as well as in the finished interior of the candy, by so compounding and treating the candy-center substance that it will maintain a smooth and relatively fine texture and relatively dry surface preliminary to coating, and so that the amount of pressure it gets from the contracted coating will serve to create the changed condition just alluded to, in the center of the finished product. However, as first hereinbefore set forth, these compositions so made up with this end in view, require very careful handling to prevent this change in condition taking place before the coating or other finishing operations.

It will be seen, therefore, that a machine such as this which forms from relatively large masses A the small approximately spherical pieces ready for coating or other further treatment without materially changing the consistency of the mass in any of these preliminary operations, greatly promotes the manufacture of such products as these; both as to quantity as compared with the heretofore necessary hand rolling and cutting and further rolling, and as to quality because there is very little chance of contamination of the product as compared with that which there is in hand rolling.

It is found in practice that the three conical rolls 26, 27 and 28 or their equivalents serve, when properly adjusted to each other, and properly coördinated by such mechanism as described, to protrude the mass $a$ in very equal amounts at every revolution; so that the cutting mechanism severs pieces which are practically uniform in mass and in shape. Therefore, it is possible owing to this very uniform mass and shape given to the severed pieces to adjust the subsequently operating roll 3 and segment plate 5 very nicely so as to avoid undue pressure as hereinbefore referred to, and at the same time deliver these pieces very nearly spherical and very uniform in this approach to the spherical shape. Lack of uniformity in size of the pieces severed would largely render futile any nice adjustment of the segment-plate 5 to the roll 3; and it is in this respect that the preliminary rolling mechanism contributes very materially to the success of the final rolling operation, the mechanism of both of which make up the machine shown in Figs. 1, 3, 5 and 6.

In the modified cutting mechanism of Fig. 4, each one of the lower rolls 26' and 27' has, fixed on the smaller end of its solid part 29', a radially projected blade 92'. The blades are so set on the respective rolls that they pass at a point between the rolls just above their common center line; and these blades are preferably hooked somewhat in the direction of their rotation. The result is that the blade of the roll 26' is passing up while the blade of the other roll 27' is passing down alongside of it. These blades, therefore, exert a shearing action on the protrusion of the mass A and constitute a much simpler mechanism than that in the previous example; although it will be seen that they operate upon the same broad principle.

The machine shown and described in detail is more particularly intended for use in candy manufacture; but it will be understood that minor variations in size, proportion and arrangement adapt such a machine to operate upon other materials such as other confections, and bread, pastry and the like, whether these materials be of the sensitive nature of some candy materials just before referred to, or more stable plastic materials which may not require the extreme care in working but which at the same time have their production greatly facilitated by the use of such a machine as this.

Also, it will be understood that other variations of use of the preliminary rolling part of the mechanism, in addition to that exemplified in Fig. 2, may be availed of, either in candy making or other branches of work; and in any of these uses minor variations of the operative connections and auxiliary details of the machine may suggest themselves whether this be in view of different materials used or other requirements.

In the particular example herein given, the two rollers 26 and 27 may be described in broad terms as supporting means, and their rotation as a movement transversely to the direction of passage of material; and the upper roller constitutes pressing means which intermittently presses the material upon the two lower rollers or supporting means, and the interruption of which pressure permits the intermittent feeding of the material in direction of the passage by the feeding means here represented by the slidable segments 31 of the rollers 26 and 27. Also, as to any of these means, such operative connection or machanism as is associated therewith may be said to constitute part of the respective means. The roll 3 and segment-plate 5 or the conveyer blade 111 are different examples of means for further disposition of the material. It will be understood that in various uses of the machine such things as these may be variously represented.

Therefore, while certain constructional details are deemed preferable in connection with our invention, and we have shown and described these rather specifically in elucidating the construction and use of our invention, as is required, we do not wish to be understood as being limited to such precise showing and description, but having thus fully described our invention, what we claim as new and desire to secure by Letters Patent is:

1. In apparatus for shaping material by passage of said material through said apparatus, supporting means, pressing means intermittently pressing said material upon said supporting means, feeding means intermittently feeding said material in the direction of said passage during the interruptions in the pressure of said pressing means, and means receiving said material from said supporting means for further disposition of said material.

2. In apparatus for shaping material by passage of said material through said apparatus, supporting means moving transversely to the direction of said passage, pressing means intermittently pressing said material upon said supporting means, feeding means intermittently feeding said material in the direction of said passage during the interruptions in the pressure of said pressing means, and means receiving said material from said supporting means for further disposition of said material.

3. In apparatus for shaping material by passage of said material through said apparatus, supporting means rotating transversely to the direction of said passage, pressing means intermittently pressing said material upon said supporting means, feeding means intermittently feeding said material in the direction of said passage during the interruptions in the pressure of said pressing means, and means receiving said material from said supporting means for further disposition of said material.

4. In apparatus for shaping material by passage of said material through said apparatus, supporting means, pressing means moving transversely to the direction of said passage and intermittently pressing said material upon said supporting means, feeding means intermittently feeding said material in the direction of said passage during the interruptions in the pressure of said pressing means, and means receiving said material from said supporting means for further disposition of said material.

5. In apparatus for shaping material by passage of said material through said apparatus, supporting means moving transversely to the direction of said passage, pressing means moving transversely to the direction of said passage and intermittently pressing said material upon said supporting means, feeding means intermittently feeding said material in the direction of said passage during the interruptions in the pressure of said pressing means, and means receiving said material from said supporting means for further disposition of said material.

6. In apparatus for shaping material by passage of said material through said apparatus, supporting means rotating transversely to the direction of said passage, pressing means moving transversely to the direction of said passage and intermittently pressing said material upon said supporting means, feeding means intermittently feeding said material in the direction of said passage during the interruptions in the pressure of said pressing means, and means receiving said material from said supporting means for further disposition of said material.

7. In apparatus for shaping material by passage of said material through said apparatus, supporting means, pressing means rotating transversely to the direction of said passage and intermittently pressing said material upon said supporting means, feeding means intermittently feeding said material in the direction of said passage during the interruptions in the pressure of said pressing means, and means receiving said material from said supporting means for further disposition of said material.

8. In apparatus for shaping material by passage of said material through said apparatus, supporting means moving transversely to the direction of said passage, pressing means rotating transversely to the direction of said passage and intermittently pressing said material upon said supporting means, feeding means intermittently feeding said material in the direction of said passage during the interruptions in the pressure of said pressing means, and means receiving said material from said supporting means for further disposition of said material.

9. In apparatus for shaping material by passage of said material through said apparatus, supporting means rotating transversely to the direction of said passage, pressing means rotating transversely to the direction of said passage and intermittently pressing said material upon said supporting means, feeding means intermittently feeding said material in the direction of said passage during the interruptions in the pressure of said pressing means, and means receiving said material from said supporting means for further disposition of said material.

10. In apparatus for shaping material by passage of said material through said apparatus, supporting means, pressing means intermittently pressing said material upon said supporting means, feeding means intermittently feeding said material in the direction of said passage during the interruptions in the pressure of said pressing means, cutting means receiving said material from said supporting means and intermittently cutting said material during the periods of pressure of said pressing means, and means receiving said material from said cutting means for further disposition of said material.

11. In apparatus for shaping material by passage of said material through said apparatus, supporting means rotating transversely to the direction of said passage, pressing means rotating transversely to the direction of said passage and intermittently pressing said material upon said supporting means, feeding means intermittently feeding said material in the direction of said passage during the interruptions in the pressure of said pressing means, cutting means receiving said material from said supporting means and intermittently cutting said material during the periods of pressure of said pressing means, and means receiving said material from said cutting means for further disposition of said material.

12. In apparatus for shaping material by passage of said material through said apparatus, supporting means, pressing means intermittently pressing said material upon said supporting means, means for adjusting said pressing means toward or away from said supporting means, feeding means intermittently feeding said material in the direction of said passage during the interruptions in the pressure of said pressing means, and means receiving said material from said supporting means for further disposition of said material.

13. In apparatus for shaping material by passage of said material through said apparatus, supporting means, pressing means intermittently pressing said material upon said supporting means, feeding means intermittently feeding said material in the direction of said passage during the interruptions in the pressure of said pressing means, means for adjusting the degree of feeding of said feeding means, and means receiving said material from said supporting means for further disposition of said material.

14. In apparatus for shaping material by passage of said material through said apparatus, supporting means, pressing means intermittently pressing said material upon said supporting means, means for adjusting said pressing means toward or away from said supporting means, feeding means intermittently feeding said material in the direction of said passage during the interruptions in the pressure of said pressing means, means for adjusting the degree of feeding of said feeding means, and means receiving said material from said supporting means for further disposition of said material.

15. In apparatus for shaping material by passage of said material through said apparatus, supporting means, pressing means intermittently pressing said material upon said supporting means, feeding means intermittently feeding said material in the direction of said passage during the interruptions in the pressure of said pressing means, whereby said material protrudes from said supporting means in the direction of said passage, cutting means intermittently cutting across said protruding material during the periods of pressure of said pressing means, severing a piece therefrom at each cutting action, and variously moving opposed elements receiving and rolling said pieces into approximately spherical shape.

16. In apparatus for shaping material by passage of said material through said apparatus, supporting means, pressing means intermittently pressing said material upon said supporting means, feeding means intermittently feeding said material in the direction of said passage during the interruptions in the pressure of said pressing means, whereby said material protrudes from said supporting means in the direction of said passage, cutting means intermittently cutting across said protruding material during the periods of pressure of said pressing means, severing a piece therefrom at each cutting action, a rotating roll, and an element spaced from and reciprocating across the curved surface of said roll, said roll and element receiving said pieces therebetween and rolling said pieces into approximately spherical shape.

17. In apparatus for shaping material by passage of said material through said apparatus, a plurality of conical rolls with their axes converging in the direction of said passage and rotating unidirectionally about their axes, pressing means intermittently pressing said material upon said rolls, feeding means intermittently feeding said material along said rolls in the direction of said passage during the interruptions in the pressure of said pressing means, and means receiving said material from said rolls for further disposition of said material.

18. In apparatus for shaping material by passage of said material through said apparatus, a plurality of conical rolls with their axes converging in the direction of said passage and rotating unidirectionally about their axes, pressing means intermittently pressing said material upon said rolls, feeding means rotating with one of said rolls, intermittently feeding said material along said rolls in the direction of said passage during the interruptions in the pressure of said pressing means, and means receiving said material from said rolls for further disposition of said material.

19. In apparatus for shaping material by passage of said material through said apparatus, a plurality of conical rolls with their axes converging in the direction of said passage and rotating unidirectionally about their axes, pressing means intermittently pressing said material upon said rolls, feeding means on the respective rolls and rotating with said rolls, intermittently feeding said material along said rolls in the direction of said passage during the interruptions in the pressure of said pressing means, and means receiving said material from said rolls for further disposition of said material.

20. In apparatus for shaping material by passage of said material through said apparatus, a plurality of conical rolls with their axes converging in the direction of said passage and rotating unidirectionally about their axes, a conical roll with its axis converging toward said plurality of rolls in said direction of passage, and rotating about its axis and intermittently pressing said material toward said plurality of rolls, feeding means intermittently feeding said material along said rolls in the direction of said passage during the interruptions in the pressure of said conical rolls, and means receiving said material from said rolls for further disposition of said material.

21. In apparatus for shaping material by passage of said material through said apparatus, a plurality of conical rolls with their axes converging in the direction of said passage and rotating unidirectionally about their axes, a segmental conical roll with its axis converging toward said plurality of rolls in said direction of passage, and rotating about its axis and thereby intermittently pressing said material toward said plurality of rolls, feeding means intermittently feeding said material along said rolls in the direction of said passage during the interruptions in the pressure of said conical roll, and means receiving said material from said rolls for further disposition of said material.

22. In apparatus for shaping material by passage of said material through said apparatus, a pair of conical rolls with their axes converging in the direction of said passage and rotating unidirectionally about their axes, a segmental conical roll above said pair of conical rolls with its axis converging down toward said plurality of rolls in said direction of passage, and rotating about its axis and thereby intermittently pressing said material toward said plurality of rolls, one of said pair of conical rolls extending higher than the other one of said pair, feeding means intermittently feeding said material along said rolls in the direction of said passage during the interruptions in the pressure of said conical roll, and means receiving said material from said rolls for further disposition of said material.

23. In apparatus for shaping material by passage of said material through said apparatus, a plurality of conical rolls, one of which comprises a main segmental part, said rolls converging in the direction of said passage and rotating unidirectionally about their respective axes, a segment movably mounted on said main segmental part of said roll, pressing means intermittently pressing said material upon said rolls, means intermittently moving said segment along said main segmental part during the interruptions in the pressure of said pressing means, and means receiving said material from said rolls for further disposition of said material.

24. In apparatus for shaping material by passage of said material through said apparatus, a plurality of conical rolls, one of which comprises a main segmental part, said rolls converging in the direction of said passage and rotating unidirectionally about their respective axes, a segment movably mounted on said main segmental part of said roll, a conical roll with its axis converging toward said plurality of rolls in said direction of passage, and rotating about its axis and intermittently pressing said material toward said plurality of rolls, means intermittently moving said segment along said main segmental part during the interruptions in the pressure of said conical roll, and means receiving said material from said rolls for further disposition of said material.

25. In apparatus for shaping material by passage of said material through said apparatus, a plurality of conical rolls, one of which comprises a main segmental part, said rolls converging in the direction of said passage and rotating unidirectionally about their respective axes, a segment movably mounted on said main segmental part of said roll, a segmental conical roll with its axis converging toward said plurality of rolls in said direction of passage, and rotating about its axis and thereby intermittently pressing said material toward said plurality of rolls, means intermittently moving said segment along said main segmental part during the interruptions in the pressure of said conical roll, and means receiving said material from said rolls for further disposition of said material.

26. In apparatus for shaping material by passage of said material through said apparatus, a plurality of conical rolls with their axes converging in the direction of said passage and rotating unidirectionally about their axes, pressing means intermittently pressing said material upon said rolls, feeding means intermittently feeding said material along said rolls in the direction of said passage during the interruptions in the pressure of said pressing means, cutting means near the converged ends of said rolls, receiving said material from said rolls and intermittently cutting said material during the periods of pressure of said pressing means, and means receiving said material from said cutting means for further disposition of said material.

27. In apparatus for shaping material by passage of said material through said apparatus, a plurality of conical rolls, one of which comprises a main segmental part, said rolls converging in the direction of said passage and rotating unidirectionally about their respective axes, a segment movably mounted on said main segmental part of said roll, pressing means intermittently pressing said material upon said rolls, means intermittently moving said segment along said main segmental part during the interruptions in the pressure of said pressing means, cutting means near the converged ends of said rolls, receiving said material from said rolls and intermittently cutting said material during the periods of pressure of said pressing means, and means receiving said material from said cutting means for further disposition of said material.

28. In apparatus for shaping material by passage of said material through said apparatus, a plurality of conical rolls, one of which comprises a main segmental part, said rolls converging in the direction of said passage and rotating unidirectionally about their respective axes, a segment movably mounted on said main segmental part of said roll, a segmental conical roll with its axis converging toward said plurality of rolls in said direction of passage, and rotating about its axis and thereby intermittently pressing said material toward said plurality of rolls, means intermittently moving said segment along said main segmental part during the interruptions in the pressure of said conical roll, whereby said material protrudes from between the converged ends of said rolls in the direction of said passage, cutting means intermittently cutting across said protruding material during the periods of pressure of said segmental roll, severing a piece therefrom at each cutting action, and variously moving opposed elements receiving and rolling said pieces into approximately spherical shape.

29. In apparatus for shaping material by passage of said material through said apparatus, a plurality of conical rolls, one of which comprises a main segmental part, said rolls converging in the direction of said passage and rotating unidirectionally about their respective axes, a segment movably mounted on said main segmental part of said roll, a segmental conical roll with its axis converging toward said plurality of rolls in said direction of passage, and rotating about its axis and thereby intermittently pressing said material toward said plurality of rolls, means intermittently moving said segment along said main segmental part during the interruptions in the pressure of said conical roll, whereby said material protrudes from between the converged ends of said rolls in the direction of said passage, cutting means intermittently cutting across said protruding material during the periods of pressure of said segmental roll, severing a piece therefrom at each cutting action, a rotating roll, and an element spaced from and reciprocating across the curved surface of said roll, said roll and element receiving said pieces therebetween and rolling said pieces into approximately spherical shape.

30. In apparatus for shaping material by passage of said material through said apparatus, a plurality of conical rolls with their axes converging in the direction of said passage and rotating unidirectionally about their axes, a conical roll with its axis converging toward said plurality of rolls in said direction of passage, and rotating about its axis and intermittently pressing said material toward said plurality of rolls, feeding means intermittently feeding said material along said rolls in the direction of said passage during the interruptions in the pressure of said conical roll, means for adjusting said segmental roll toward or away from said plurality of rolls, and means receiving said material from said rolls for further disposition of said material.

31. In apparatus for shaping material by passage of said material through said apparatus, a plurality of conical rolls, one of which comprises a main segmental part, said rolls converging in the direction of said passage and rotating unidirectionally about their respective axes, a segment movably mounted on said main segmental part of said roll, pressing means intermittently pressing said material upon said rolls, means intermittently moving said segment along said main segmental part during the interruptions in the pressure of said pressing means, means for changing the degree of movement of said segment along said main segmental part, and means receiving said material from said rolls for further disposition of said material.

32. In apparatus for shaping material by passage of said material through said apparatus, a plurality of conical rolls, one of which comprises a main segmental part, said rolls converging in the direction of said passage and rotating unidirectionally about their respective axes, a segment movably mounted on said main segmental part of said roll, pressing means intermittently pressing said material upon said rolls, means intermittently moving said segment along said main segmental part during the interruptions in the pressure of said pressing means, means for changing the degree of movement of said segment along said main segmental part, means for adjusting said segmental roll toward or away from said plurality of rolls, and means receiving said material from said rolls for further disposition of said material.

33. In apparatus for shaping material by passage of said material through said apparatus, a plurality of conical rolls, each one of which comprises a main segmental part, said rolls converging in the direction of said passage and rotating unidirectionally about their respective axes, segments movably mounted on the respective main segmental parts of said rolls, pressing means intermittently pressing said material upon said rolls, means intermittently moving said segments simultaneously along the respective main segmental parts in the direction of said passage during the interruptions in the pressure of said pressing means, and means receiving said material from said rolls for further disposition of said material.

34. In apparatus for shaping material by passage of said material through said apparatus, a plurality of conical rolls, each one of which comprises a main segmental part, said rolls converging in the direction of said passage and rotating unidirectionally about their respective axes, segments movably mounted on the respective main segmental parts of said rolls, a segmental conical roll with its axis converging toward said plurality of rolls in said direction of passage, and rotating about its axis and thereby intermittently pressing said material toward said plurality of rolls, means intermittently moving said segments simultaneously along the respective main segmental parts in the direction of said passage during the interruptions in the pressure of said pressing means, and means receiving said material from said rolls for further disposition of said material.

35. In apparatus for shaping material by passage of said material through said apparatus, a plurality of conical rolls, each one of which comprises a main segmental part, said rolls converging in the direction of said passage and rotating unidirectionally about their respective axes, segments movably mounted on the respective main segmental parts of said rolls, a segmental conical roll with its axis converging toward said plurality of rolls in said direction of passage, and rotating about its axis and thereby intermittently pressing said material toward said plurality of rolls, means intermittently moving said segments simultaneously along the respective main segmental parts in the direction of said passage during the interruptions in the pressure of said conical roll, cutting means near the converged ends of said rolls, receiving said material from said rolls and intermittently cutting said material during the periods of pressure of said pressing means, and means receiving said material from said cutting means for further disposition of said material.

36. In apparatus for shaping material by passage of said material through said apparatus, supporting means comprising a segmental conical main part with its axis extending in the direction of said passage, a shaft on which said main part is coaxially fixed, a segmental part complementary to said main part and slidably mounted on said shaft, operative mechanism to move said complementary part in the direction of said passage, and a spring to return said part in the opposite direction, pressing means intermittently pressing said material upon said supporting means within the periods of return of said part in said opposite direction, and means receiving said material from said supporting means for further disposition of said material.

37. In apparatus for shaping material by passage of said material through said apparatus, supporting means comprising a segmental conical main part with its axis extending in the direction of said passage, a shaft on which said main part is coaxially fixed, a segmental part complementary to said main part and slidably mounted on said shaft, a fork movably mounted in said apparatus and adapted to engage with an end of said complementary part, operative mechanism to alternately move said fork in the direction of said passage and permit return of said fork, and a spring to return said part in the opposite direction, pressing means intermittently pressing said material upon said supporting means within the periods of return of said part in said opposite direction, and means receiving said material from said supporting means for further disposition of said material.

38. In apparatus of the character described, a combined supporting and feeding means comprising a segmental conical main part with its axis extending in the direction of feeding passage, a shaft on which said main part is coaxially fixed, a segmental part complementary to said main part and slidably mounted on said shaft, operative mechanism to move said complementary part in the direction of said passage, and a spring to return said part in the opposite direction.

39. In apparatus of the character described, a combined supporting and feeding means comprising a segmental conical main part with its axis extending in the direction of feeding passage, a shaft on which said main part is coaxially fixed, a segmental part complementary to said main part and slidably mounted on said shaft, a fork movably mounted in said apparatus and adapted to engage with an end of said complementary part, operative mechanism to alternately move said fork in the direction of said passage and permit return of said fork, and a spring to return said part in the opposite direction.

40. In apparatus of the character described, a plurality of juxtaposed rolls, means whereby said rolls continuously rotate a mass of material about an axis of the material, and means whereby said rolls alternately compress said mass axially and advance said mass in the direction of its axis.

41. In apparatus of the character described, a plurality of converging rolls, means whereby said rolls continuously rotate a mass of material about an axis of the material, and means whereby said rolls alternately compress said mass axially and advance said mass in the direction of convergence of said rolls.

42. In apparatus of the character described, a plurality of juxtaposed conical rolls, means whereby said rolls continuously rotate a mass of material about an axis of the material, and means whereby said rolls alternately compress said mass axially and advance said mass in the direction of its axis.

43. In apparatus of the character described, a plurality of converging conical rolls, means whereby said rolls continuously rotate a mass of material about an axis of the material, and means whereby said rolls alternately compress said mass axially and advance said mass in the direction of convergence of said rolls.

44. In apparatus of the character described, a plurality of converging rolls, means whereby said rolls continuously rotate a mass of material about an axis of the material, means whereby said rolls alternately compress said mass axially and advance said mass in the direction of convergence of said rolls, and means for adjusting the convergence of said rolls.

45. In apparatus of the character described, a plurality of converging rolls, means whereby said rolls continuously rotate a mass of material about an axis of the material, means whereby said rolls alternately compress said mass axially and advance said mass in the direction of convergence of said rolls, and means for varying the advance of said mass by said rolls.

46. In apparatus of the character described, a plurality of converging rolls, means whereby said rolls continuously rotate a mass of material about an axis of the material, means whereby said rolls alternately compress said mass axially and advance said mass in the direction of convergence of said rolls, means for varying the advance of said mass by said rolls, and means for adjusting the convergence of said rolls.

47. In apparatus of the character described, an element moving continuously in a single direction, and another element spaced from and reciprocating across the surface of the first mentioned element, said elements receiving pieces therebetween and rolling said pieces into approximately spherical shape.

48. In apparatus of the character described, variously moving opposed elements receiving pieces therebetween and rolling said pieces into approximately spherical shape, and means for adjusting one of said elements toward or away from the other element.

49. In apparatus of the character described, an element moving continuously in a single direction, another element spaced from and reciprocating across the surface of the first mentioned element, said elements receiving pieces therebetween and rolling said pieces into approximately spherical shape, and means for adjusting one of said elements toward or away from the other element.

50. In apparatus of the character described, a rotating roll, and an element spaced from and reciprocating across the curved surface of said roll, said roll and element receiving pieces therebetween and rolling said pieces into approximately spherical shape.

51. In apparatus of the character described, a rotating roll, an element spaced from and reciprocating across the curved surface of said roll, said roll and element receiving pieces therebetween and rolling said pieces into approximately spherical shape, and means for automatically supplying said pieces between said roll and said element.

52. In apparatus of the character described, a rotating roll, an element spaced from and reciprocating across the curved surface of said roll, said roll and element receiving pieces therebetween and rolling said pieces into approximately spherical shape, and means for adjusting said element toward or away from said roll.

53. In apparatus of the character described, a rotating roll, an element spaced from and reciprocating across the curved surface of said roll, said roll and element receiving pieces therebetween and rolling said pieces into approximately spherical shape, mechanism for automatically supplying said pieces between said roll and said element, and means comprised in said mechanism for varying the size of said pieces.

54. In apparatus of the character described, a rotating roll, an element spaced from and reciprocating across the curved surface of said roll, said roll and element receiving pieces therebetween and rolling said pieces into approximately spherical shape, means for adjusting said element toward or away from said roll, mechanism for automatically supplying said pieces between said roll and said element, and means comprised in said mechanism for varying the size of said pieces.

EDWARD C. BECHT.
HERMAN W. BECHT.

Witnesses:
 JOHN R. WOODS,
 JOHN B. SCOTT.

Copies of this patent may be obtained for five cents each, by addressing the "Commissioner of Patents, Washington, D. C."